United States Patent
Varela et al.

(10) Patent No.: US 7,618,049 B2
(45) Date of Patent: Nov. 17, 2009

(54) TRAILING ARM SUSPENSION

(75) Inventors: Tomaz Dopico Varela, Shelby Township, MI (US); Xinyu Wen, Shelby Township, MI (US); Kou Yang, Goodrich, MI (US); Ragnar H. Ledesma, Sterling Heights, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 288 days.

(21) Appl. No.: 11/522,042

(22) Filed: Sep. 15, 2006

(65) Prior Publication Data

US 2008/0067771 A1 Mar. 20, 2008

(51) Int. Cl.
*B60G 21/05* (2006.01)
(52) U.S. Cl. .................. 280/124.116; 280/124.106; 280/124.128
(58) Field of Classification Search .......... 280/124.116, 280/124.11, 124.106, 124.156, 124.157, 280/124.128
See application file for complete search history.

(56) References Cited

U.S. PATENT DOCUMENTS

| | | | |
|---|---|---|---|
| 2,352,446 A * | 6/1944 | Pointer ........................ 267/196 |
| 2,879,076 A * | 3/1959 | Stricker, Jr. ................ 280/676 |
| 3,547,215 A * | 12/1970 | Bird ........................ 280/86.75 |
| 4,162,799 A | 7/1979 | Willetts |
| 4,168,082 A * | 9/1979 | Hendrickson ............ 280/405.1 |
| 4,615,539 A * | 10/1986 | Pierce ................. 280/124.116 |
| 4,714,269 A | 12/1987 | Raidel |
| 4,856,812 A | 8/1989 | Stephens |
| 4,858,948 A | 8/1989 | Raidel |
| 4,858,949 A | 8/1989 | Wallace |
| 4,919,399 A | 4/1990 | Selzer |
| 5,037,126 A * | 8/1991 | Gottschalk et al. ..... 280/124.116 |
| 5,634,655 A | 6/1997 | Chalin |
| 5,678,845 A * | 10/1997 | Stuart ................... 280/124.116 |
| 6,394,474 B1 | 5/2002 | Warinner |
| 6,428,027 B1 | 8/2002 | Stuart |
| 6,508,482 B2 * | 1/2003 | Pierce et al. ........... 280/124.116 |
| 6,733,020 B2 | 5/2004 | Reineck |
| 6,808,191 B1 * | 10/2004 | Buhl et al. ............. 280/124.107 |
| 6,824,143 B2 | 11/2004 | Choi |
| 6,843,490 B2 * | 1/2005 | Raidel et al. ........... 280/124.116 |
| 6,886,840 B2 | 5/2005 | Reineck |
| 7,178,817 B1 * | 2/2007 | Welles et al. ........... 280/124.128 |
| 7,300,064 B2 * | 11/2007 | Johnson et al. ........ 280/124.106 |
| 7,360,775 B2 * | 4/2008 | Anderson et al. ...... 280/124.128 |
| 7,445,220 B2 * | 11/2008 | von Mayenburg et al. .................... 280/124.116 |
| 2004/0007843 A1 * | 1/2004 | Reineck ................ 280/124.107 |
| 2004/0021288 A1 * | 2/2004 | Raidel et al. ........... 280/124.177 |
| 2004/0245732 A1 | 12/2004 | Kotulla |

(Continued)

FOREIGN PATENT DOCUMENTS

EP    0 410 680 B1    5/1995

(Continued)

*Primary Examiner*—Paul N Dickson
*Assistant Examiner*—Drew Brown
(74) *Attorney, Agent, or Firm*—Carlson, Gaskey & Olds

(57) ABSTRACT

A vehicle suspension includes trailing arm assemblies that have one end pivotally mounted to a first suspension rail, an opposite end with an air spring support formed with the trailing arm, and an axle mount portion that is mounted to an axle beam. A Panhard arm provides lateral stiffness and includes a first pivotal connection to the trailing arm and a second pivotal connection to a second suspension rail laterally spaced from the first suspension rail.

25 Claims, 6 Drawing Sheets

U.S. PATENT DOCUMENTS

| | | |
|---|---|---|
| 2005/0082783 A1 | 4/2005 | Ramsey |
| 2005/0146110 A1* | 7/2005 | Dudding .............. 280/124.128 |
| 2005/0156398 A1* | 7/2005 | Ramsey ............... 280/124.116 |
| 2005/0173883 A1* | 8/2005 | Mayenburg et al. ... 280/124.116 |
| 2005/0263985 A1 | 12/2005 | Miller |

FOREIGN PATENT DOCUMENTS

| | | |
|---|---|---|
| EP | 1 486 359 A2 | 12/2004 |
| WO | WO 01/70525 A1 | 9/2001 |
| WO | WO 2005/028221 A1 | 3/2005 |

* cited by examiner

TRAILING ARM SUSPENSION

TECHNICAL FIELD

The subject invention relates to a lightweight trailing arm for a vehicle suspension.

BACKGROUND OF THE INVENTION

The heavy duty trucking industry is seeking alternative suspension system solutions that offer a better ride performance than-conventional mechanical leaf suspensions, while maintaining or improving handling performance. Light to medium heavy suspensions, i.e. suspensions for up to approximately 14,000 pounds, have utilized air suspension configurations that provide improved ride performance, but which have marginal handling performance.

One solution for heavy front suspensions, i.e. suspensions for up to approximately 20,000-23,000 pounds, is the use of an independent front suspension. The independent front suspension has good ride and handling performance, however, this type of suspension is complex, heavy, difficult to package in a truck, and is cost prohibitive. Another solution utilizes a multi-link air suspension, which provides good ride and handling performance. However, this type of system is also heavy, complex, and expensive.

Trailing arm air suspensions offer a reasonable compromise between cost and performance, however, these suspensions can exhibit excessive brake dive. Excessive brake dive can cause the suspension to hit bump stops during severe braking applications. Repeated contact between suspension components and the bump stops can adversely affect suspension performance and the overall wear life of the suspensions components.

Thus, there is a need for a trailing arm suspension for a heavy duty vehicle that does not experience the adverse effects of excessive brake dive, and which overcomes the other above-mentioned difficulties in the prior art.

SUMMARY OF THE INVENTION

A vehicle suspension includes a pair of trailing arms that cooperate with a Panhard arm to provide desired fore/aft and lateral stiffness. Each trailing arm includes a first end with a pivot mount for attachment to a suspension rail, a second end with an air spring support formed with the trailing arm, and an axle mount portion for attachment to an axle beam. A Panhard arm provides lateral stiffness and includes a first pivotal connection to one trailing arm and a second pivotal connection to another suspension rail laterally spaced from the one trailing arm.

In one example, each trailing arm includes a Panhard arm mount that is integrally formed with the trailing arm. In one configuration, the Panhard arm mount comprises an upwardly extending mounting boss that supports a pivot.

In one example, the axle mount portion of each trailing arm includes a mounting boss for direct attachment to the axle beam. In one configuration, the mounting boss comprises a laterally protruding portion that extends outwardly from the trailing arm.

In one example, the air spring support of each trailing arm includes a first support for supporting a first air spring and a second support for supporting a second air spring. The first and second air springs are longitudinally spaced apart from each other. In one configuration, the first air spring is positioned at an associated wheel center and the second air spring is spaced from the first air spring in a rearward direction. The trailing arm of the present invention comprises a light-weight arm with reduced mounting structure, and which counteracts brake wind-up and reduces brake dive and caster angle variation.

In one example, the air spring support of each trailing arm comprises an air spring platform integrally formed with the trailing arm. This allows the air spring to be directly supported by the trailing arm, with no additional components needed to provide the benefit of a significantly simplified setup with reduced maintenance requirements. Further, a clamp group for axle attachment is also significantly simplified with the use of an integrated mounting boss as discussed above.

These and other features of the present invention can be best understood from the following specification and drawings, the following of which is a brief description.

DETAILED DESCRIPTION OF THE PREFERRED EMBODIMENT

Figure 1:
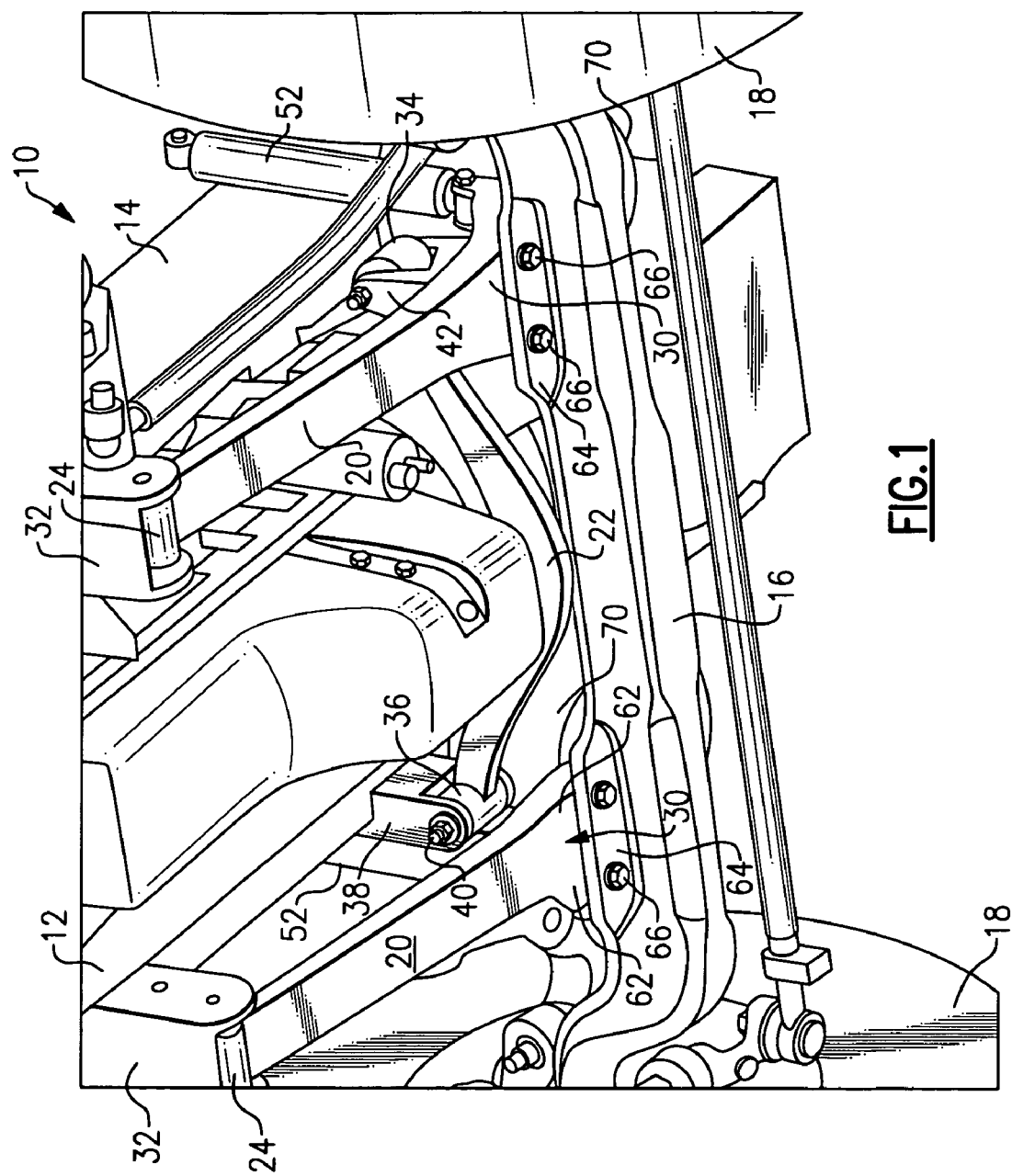
FIG. 1 is a bottom view of one example of a trailing arm suspension incorporating the subject invention.

A trailing arm suspension 10 for a heavy duty vehicle is shown in FIG. 1. A first frame member 12 extends in a longitudinal direction along a vehicle length. A second frame member 14 is laterally spaced from the first frame member 12 and also extends along the longitudinal direction. The first 12 and second 14 frame members are also referred to as frame rails.

An axle beam 16 extends between laterally spaced wheels 18 that rotate about an axis of rotation that extends in a lateral direction. The axle beam 16 is used in a front non-drive steer axle configuration, however, the subject suspension 10 could also be utilized with other types of axles. The trailing arm suspension 10 connects the axle beam 16 to the first 12 and second 14 frame members.

The trailing arm suspension 10 includes a pair of trailing arms 20 that cooperate with a Panhard arm 22 to provide desired fore/aft and lateral stiffness for improved ride and handling performance. The trailing arms 20 are separate from each other and are laterally spaced apart in a direction along the axis of rotation of the wheels.

Figure 2:
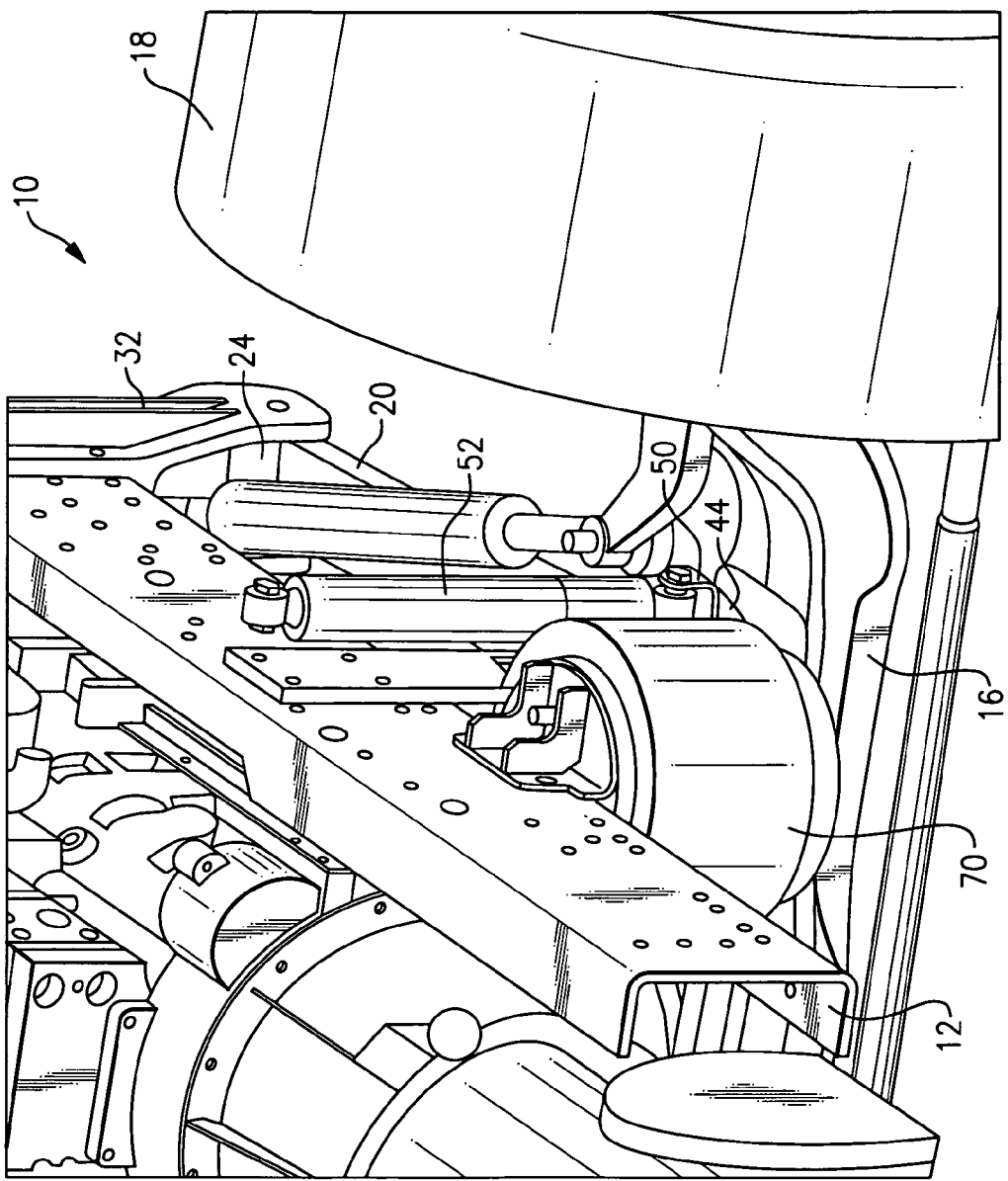
FIG. 2 is a top view of the trailing arm suspension shown in FIG. 1.
Figure 3:
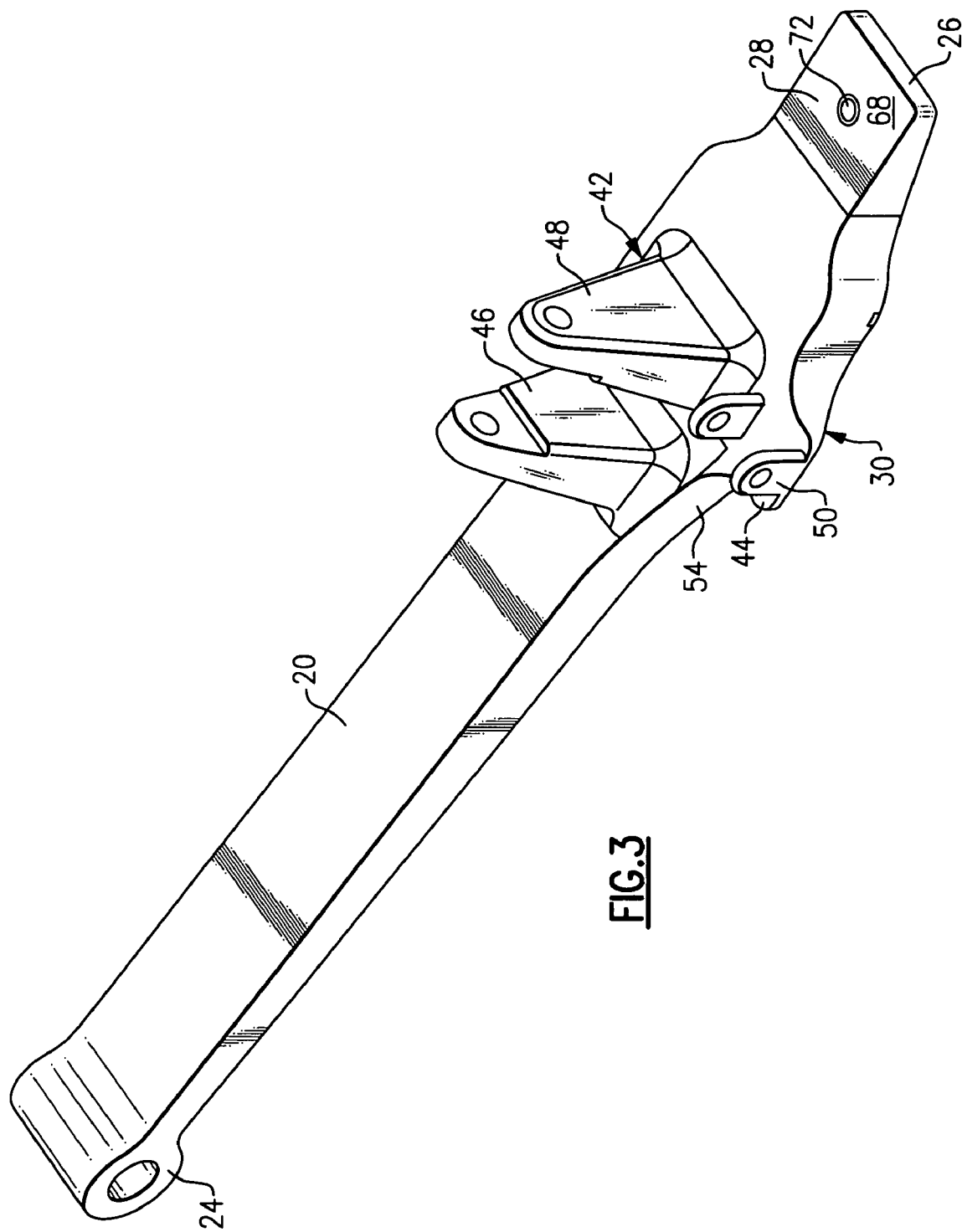
FIG. 3 is a perspective view of a trailing arm from the trailing arm suspension shown in FIGS. 1-2.

In the example shown in FIGS. 1-3, each trailing arm 20 includes a first end 24 with a pivot mount for attachment to one of the first 12 and second 14 frame members, and a second end 26 having an air spring platform 28 integrally formed with the trailing arm 20. Each trailing arm 20 also includes an axle mount portion 30 for attachment to the axle beam 16. The axle mount portion 30 is positioned longitudinally between the air spring platform 28 and the first end 24. Hanger brackets 32 are mounted to each of the first 12 and second 14 frame members and extend downwardly from the respective first 12 and second 14 frame members to pivotally connect to the first ends 24 of the trailing arms 20.

The Panhard arm 22 provides lateral stiffness and includes a first pivotal connection 34 to one trailing arm 20 and a second pivotal connection 36 to the one of the first 12 and second 14 frame members that is laterally spaced from the first pivotal connection 34. In the example shown in FIG. 1, the first pivotal connection 34 of the Panhard arm 22 is to the trailing arm 20 shown on the right hand side, and the second pivotal connection 36 is to the first frame member 12, i.e. the frame member on the left hand side. A bracket 38 is mounted to the first frame member 12 and is pivotally connected to the Panhard arm 22 with a pivot pin 40. It should be understood that the opposite configuration could also be utilized, e.g. the Panhard arm 22 having one end mounted to the trailing arm 20 on the left and an opposite end mounted to the second frame member 14.

In the examples shown in FIGS. 1-3, each trailing arm 20 includes a Panhard arm mount 42 that is integrally formed with the trailing arm 20. In one example configuration, the Panhard arm mount 42 comprises an upwardly extending mounting boss that supports a pivot. The mounting boss includes first 46 and second 48 boss pivot legs that are longitudinally spaced apart from each other to allow the Panhard arm 22 to rotate about a longitudinal axis relative to the trailing arm 20.

Also, in this example, each trailing arm 20 includes an integrally formed mounting boss 50 for a shock absorber 52. This mounting boss 50 is formed on a lateral protrusion 44 that extends outwardly from an outboard edge 54 of the trailing arm 20.

Each trailing arm 20 also includes the axle mount portion 30, which is directly attached to the axle beam 16. In the example shown in FIGS. 1-3, the axle mount portion 30 is integrally formed with the trailing arm 20 and comprises a mounting flange area 62 for direct attachment to the axle beam 16. The mounting flange area 62 comprises a widened portion, i.e. a portion widened in a lateral direction, that rests directly on top of a corresponding mounting flange 64 formed on the axle beam 16. Fasteners 66 secure the trailing arm 20 directly to the axle beam 16.

Also, as discussed above, each trailing arm 20 includes an air spring platform 28 that is integrally formed within the trailing arm 20. In the example shown in FIGS. 1-3, the air spring platform 28 includes a base 68 that supports an air spring 70. The base 68 includes an opening 72 (FIG. 3) for receiving a fastener (not shown) such that a bottom of the air spring 70 can be attached directly to the trailing arm 20. A top of the air spring 70 is attached to one of the first 12 and second 14 frame members as known.

The trailing arm 20 includes an integrated axle mount, air spring support, and pan hand arm mount, which are formed as a single piece component by casting or forging. This integrated configuration, which integrates axle attachment, lateral member attachment, and air spring support, provides significant weight savings when compared to conventional trailing arm suspensions, multi-leaf mechanical suspensions, or independent front suspensions. Further, the vehicle is fully supported by the air springs to provide a soft ride, while the stiffness of the fore/aft arms and Panhard arm can be tuned independently to achieve an optimized handling performance.

Figure 4:
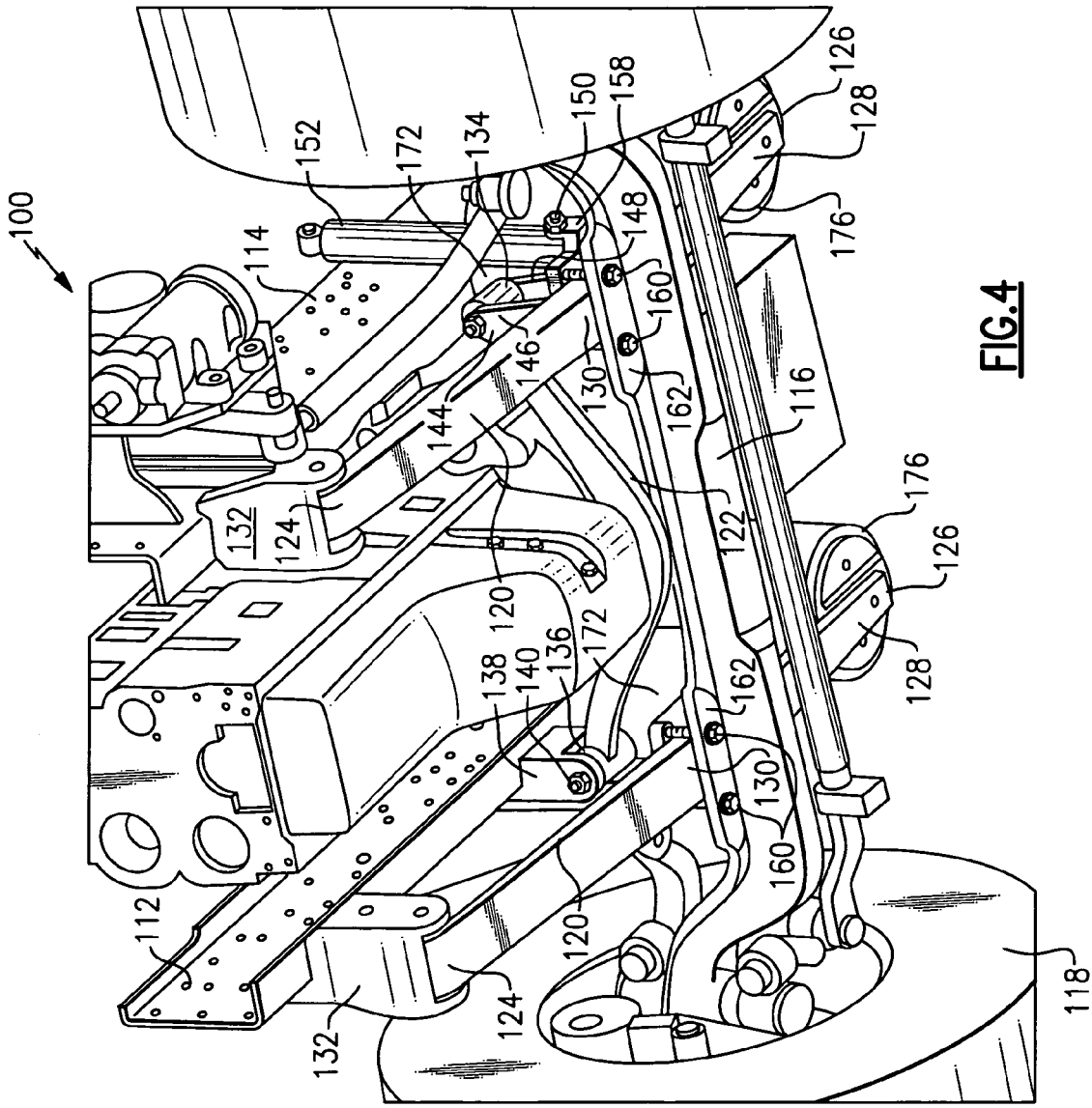
FIG. 4 is a bottom view of another example of a trailing arm suspension incorporating the subject invention.
Figure 5:
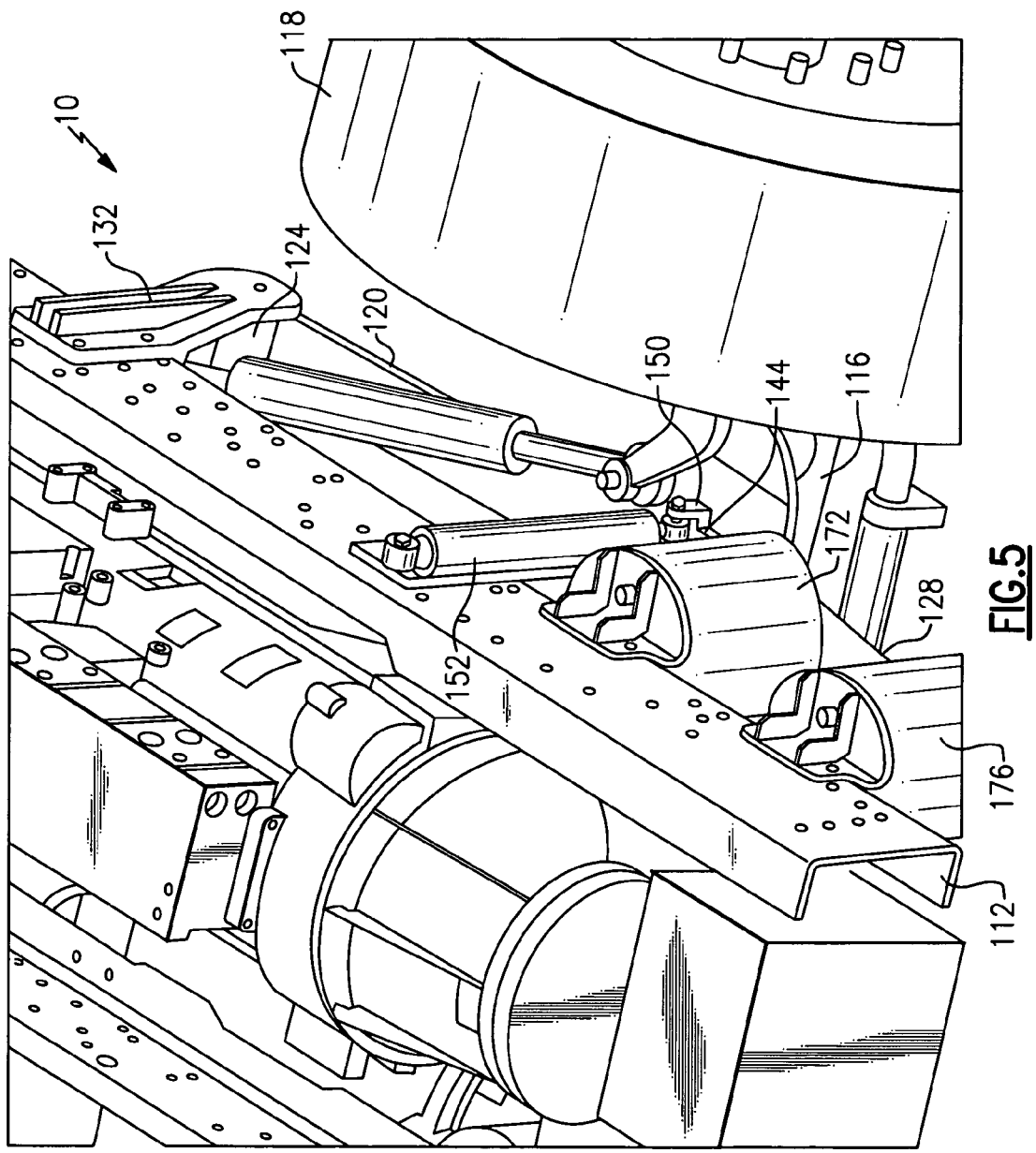
FIG. 5 is a top view of the trailing arm suspension shown in FIG. 4.
Figure 6:
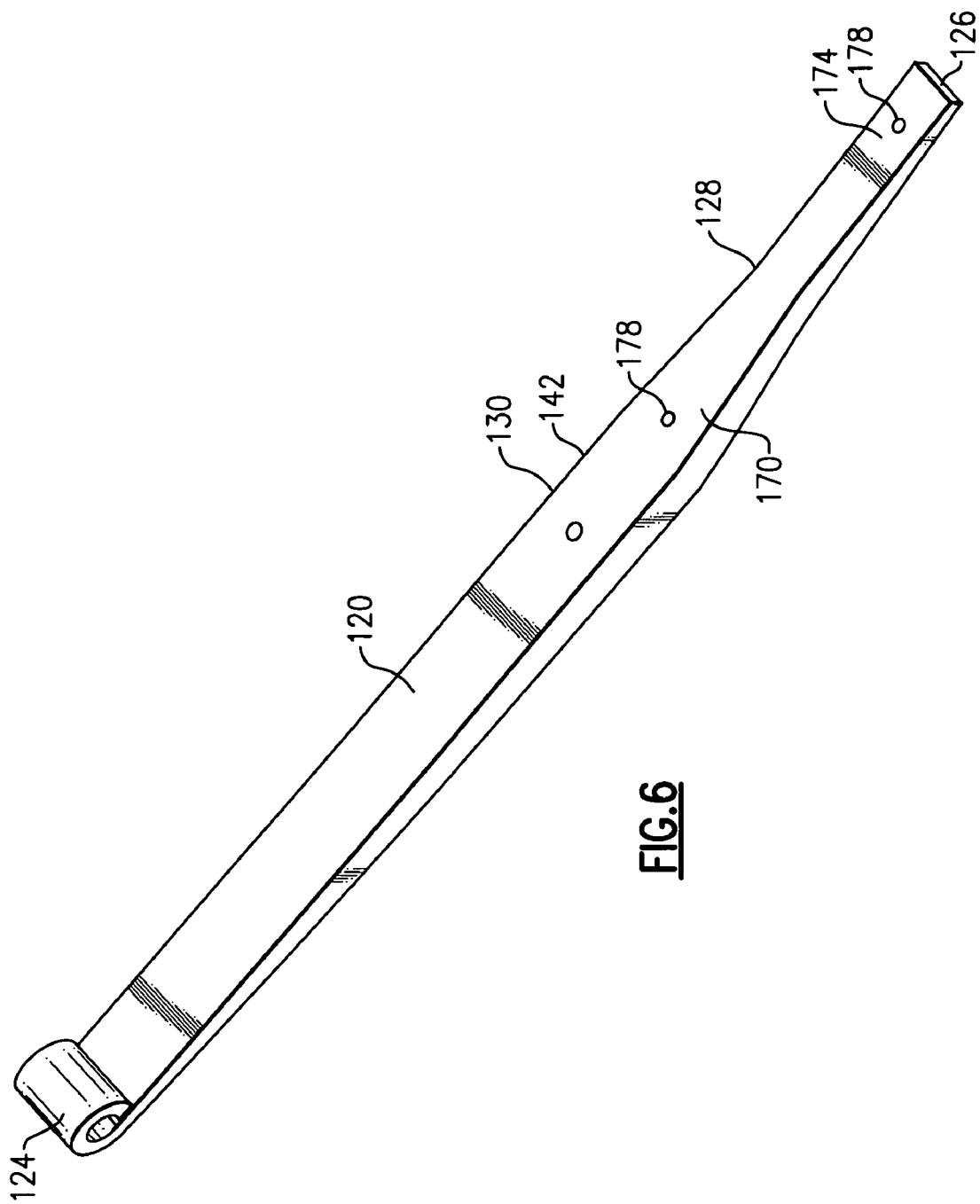
FIG. 6 is a perspective view of a trailing arm from the trailing arm suspension shown in FIGS. 4-5.

Another example of a trailing arm for a trailing arm suspension 100 is shown in FIGS. 4-6. First 112 and second 114 frame members 112 extend in a longitudinal direction as described above. Also as described above, an axle beam 116 extends between laterally spaced wheels 118 that rotate about an axis of rotation that extends in a lateral direction. The trailing arm suspension 110 connects the axle beam 116 to the first 112 and second 114 frame members.

The trailing arm suspension 110 includes a pair of trailing arms 120 that cooperate with a Panhard arm 122 to provide desired fore/aft and lateral stiffness for improved ride and handling performance. The trailing arms 120 are separate from each other and are laterally spaced apart in a direction along the axis of rotation of the wheels.

In the example shown in FIGS. 4-6, each trailing arm 120 includes a first end 124 with a pivot mount for attachment to one of the first 112 and second 114 frame members, and a second end 126 having an air spring support portion 128 integrally formed with the trailing arm 120. Each trailing arm 120 also includes an axle mount area 130 for attachment to the axle beam 116. The axle mount area 130 is positioned longitudinally between the air spring support portion 128 and the first end 124. Hanger brackets 132 are mounted to each of the first 112 and second 114 frame members and extend downwardly from the respective first 112 and second 114 frame members to pivotally connect to the first ends 124 of the trailing arms 120.

The Panhard arm 122 provides lateral stiffness and includes a first pivotal connection 134 to one trailing arm 120 and a second pivotal connection 136 to the one of the first 112 and second 114 frame members that is laterally spaced from the first pivotal connection 134. In the example shown in FIG. 4, the first pivotal connection 134 of the Panhard arm 122 is to the trailing arm 120 shown on the right hand side, and the second pivotal connection 136 is to the first frame member 112, i.e. the frame member on the left hand side. A bracket 138 is mounted to the first frame member 112 and is pivotally connected to the Panhard arm 122 with a pivot pin 140. It should be understood that the opposite configuration could also be utilized as described above.

In this example, the trailing arm 120 is comprised of a conventional spring material and serves as a fore/aft control member. The trailing arm 120 has a variable thickness portion that extends behind the axle beam 116. As shown in FIG. 6, the trailing arm 120 is thickest at the axle mount area 130 for increased strength and decreases in thickness in a rearward direction toward the air spring support portion 128. This helps to further reduce weight.

In the examples shown in FIGS. 4-6, each trailing arm 20 includes a Panhard arm mount area 142 that supports a mounting bracket 144. In one example configuration, the mounting bracket 144 includes an upwardly extending mounting boss that supports a pivot for connection to the Panhard arm 122. The mounting boss includes first 146 and second 148 boss pivot legs that are longitudinally spaced apart from each other to allow the Panhard arm 122 to rotate about a longitudinal axis relative to the trailing arm 120.

Also, in this example, the mounting bracket 144 includes an integrally formed mounting boss 150 for a shock absorber 152. This mounting boss 150 is formed on a lateral protrusion 158 that extends outwardly from an edge of the mounting bracket 144.

Each trailing arm 120 also includes the axle mount area 130, which is clamped directly against the axle beam 116 by the mounting bracket 144. Fasteners 160 are used to secure the mounting bracket 144 to a flange 162 on the axle beam 116, with the trailing arm 120 being clamped therebetween.

Also, as discussed above, each trailing arm 120 includes an air spring support portion 128 that is integrally formed with the trailing arm 120. In the example shown in FIGS. 4-6, the air spring support portion 128 includes a first base portion 170 that supports a first air spring 172 and a second base portion 174 that supports a second air spring 176. The first 170 and second 174 base portions are longitudinally spaced apart from each other along a common axis. Brackets are used to attach the first 172 and second 176 air springs to the air spring support portion 128. The first 170 and second 174 base portions include openings 178 (FIG. 6) for receiving a fastener (not shown) that helps to secure the first 172 and second 176 air springs to the trailing arm 120. A top of each of the first 172 and second 176 air springs is attached to one of the first 112 and second 114 frame members by known attachment interfaces In one example, the first air spring 172 is positioned to be centered near the axis of rotation for the wheel 118 and the second air spring 176 is positioned to be further away from the wheel 118 to be adjacent a rear end of the trailing arm 120. The use of two smaller air springs as shown in this example configuration (instead of using a single larger air spring) results in an increased force arm especially from the rearward second air spring 176, which cooperates with the trailing arm 120 to counteract brake wind-up torque. This reduces brake dive as well as caster angle variation during vertical travel of the suspension. The Panhard arm 122, which connects one of the trailing arms 120 to an opposing frame rail, provides significantly improved lateral stiffness. This configuration provides more opportunities for optimizing suspension geometry at a significantly lower cost when compared with conventional independent front suspensions and multi-link suspensions.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A trailing arm assembly for a vehicle suspension comprising:
   a first trailing arm having a first end including a pivotal mount adapted for connection to a first frame member, a second end including an air spring support portion formed with said first trailing arm to support at least one air spring, and an axle mount portion formed between said first and second ends for attachment to an axle beam; and
   a Panhard arm having one end connected to said first trailing arm at a position longitudinally between said air spring support portion and said first end and an opposite end including a pivotal mount for attachment to a second frame member laterally spaced from the first frame member.

2. The trailing arm assembly according to claim 1 wherein said first trailing arm includes a Panhard arm mount integrally formed with said first trailing arm adjacent said axle mount portion and between said pivotal mount and said air spring support portion.

3. The trailing arm assembly according to claim 2 wherein the first and second frame members extend in a longitudinal direction along a length of a vehicle with said Panhard arm extending in a lateral direction from said first trailing arm to the second frame member.

4. The trailing arm assembly according to claim 1 wherein said axle mount portion comprises a mounting boss for direct attachment to the axle beam, said mounting boss comprising a laterally widened portion of said first trailing arm that forms a mounting flange that rests directly on a corresponding mounting flange formed on the axle beam.

5. The trailing arm assembly according to claim 4 wherein said first trailing arm comprises one of a cast arm and a forged arm such that said mounting boss is integrally formed as a single piece with said first trailing arm.

6. The trailing arm assembly according to claim 1 wherein said air spring support portion comprises a first support portion that supports a first air spring and a second support portion that supports a second air spring, said first and said second support portions extending along a common longitudinal axis.

7. The trailing arm assembly according to claim 6 wherein said first air spring is positioned adjacent an associated wheel center and said second air spring is offset from the associated wheel center in a rearward vehicle direction.

8. The trailing arm assembly according to claim 6 wherein said first trailing arm has a variable thickness extending along a length of said first trailing arm.

9. The trailing arm assembly according to claim 1 including a second trailing arm separate from said first trailing arm and having a first end including a pivotal mount adapted for connection to the second frame member laterally spaced from the first frame member, a second end including an air spring support portion integrally formed with said second trailing arm to support at least one air spring, and an axle mount portion formed between said first and second ends of said second trailing arm for attachment to the axle beam.

10. The trailing arm assembly according to claim 1 wherein said air spring support portion comprises an air spring platform integrally formed with said first trailing arm to directly support the at least one air spring.

11. The trailing arm assembly according to claim 1 wherein said first trailing arm comprises a resilient member made from a spring material.

12. The trailing arm assembly according to claim 1 including a downwardly extending bracket adapted for direct connection to the second frame member, and wherein said opposite end of said Panhard arm is directly connected to said downwardly extending bracket.

13. The trailing arm assembly according to claim 1 wherein said first trailing arm comprises a single-piece resilient member with said first end comprising one of a fore and aft endmost position and with said second end comprising the other of the fore and aft endmost position, and wherein said air spring support portion is provided at one of said fore and aft endmost positions, said pivotal mount is at the other of said fore and aft endmost positions, and said axle mount portion is longitudinally positioned between said fore and aft endmost positions such that at least one air spring is longitudinally offset from the axle beam.

14. A trailing arm assembly for a vehicle suspension comprising:
   a first trailing arm having a first end including a pivotal mount adapted for connection to a first frame member, a second end including an air spring support portion formed with said first trailing arm to support at least one air spring, and an axle mount portion formed between said first and second ends for attachment to an axle beam;
   a second trailing arm separate from said first trailing arm and having a first end including a pivotal mount adapted for connection to a second frame member laterally spaced from the first frame member, a second end including an air spring support portion integrally formed with said second trailing arm to support at least one air spring, and an axle mount portion formed between said first and second ends of said second trailing arm for attachment to the axle beam; and
   a Panhard arm having one end pivotally mounted to one of said first and said second trailing arms at a position longitudinally between said first end of said one of said first and said second trailing arms and an associated air spring support portion and an opposite end having a pivot mount for attachment to one of the first and second frame members laterally spaced from said one of said first and second trailing arms.

15. The trailing arm assembly according to claim 14 wherein the axle beam extends in a lateral direction and said at least one air spring associated with each of said first and second trailing arms are longitudinally offset from the axle beam by being located at an endmost trailing arm position, and wherein said one of said first and second trailing arms includes a Panhard arm mount interface that is positioned immediately adjacent said axle mount portion at a location longitudinally between said at least one air spring and said pivotal mount.

16. A vehicle suspension comprising:
a first trailing arm having a first end including a pivotal mount adapted for connection to a first frame member, a second end including an air spring support portion to support at least one air spring, and an axle mount portion formed between said first and second ends for attachment to an axle beam;
a second trailing arm having a first end including a pivotal mount adapted for connection to a second frame member laterally spaced from the first frame member, a second end including an air spring support portion to support at least one air spring, and an axle mount portion formed between said first and second ends of said second trailing arm for attachment to the axle beam; and
a Panhard arm having one end pivotally mounted to one of said first and said second trailing arms at a position longitudinally between said first end of said one of said first and said second trailing arms and an associated air spring support portion and an opposite end having a pivot mount for attachment to one of the first and second frame members laterally spaced from said one of said first and second trailing arms.

17. The vehicle suspension according to claim 16 wherein the first and second frame members comprise suspension rails that extend longitudinally along a vehicle length and wherein the axle beam extends in a lateral direction between first and second wheels that rotate about a common axis of rotation with said Panhard arm extending along the lateral direction, and wherein said one of said first and said second trailing arms includes a Panhard arm mount interface at a position immediately adjacent said axle mount portion and with said at least one air spring of each of said first and said second trailing arms being located at an endmost arm position.

18. The vehicle suspension according to claim 17 wherein said Panhard arm mount interface comprises a Panhard arm mount integrally formed with said one of said first and said second trailing arms; and wherein said air spring support portions for each of said first and second trailing arms comprise an air spring platform that is integrally formed with said first and said second trailing arms at said endmost arm positions with each of said at least one air spring being directly supported by a respective air spring platform.

19. The vehicle suspension according to claim 18 wherein said Panhard arm mount comprises at least one mounting boss that extends upwardly from said one of said first and said second trailing arms.

20. The vehicle suspension according to claim 18 wherein said axle mount portion of each of said first and said second trailing arms comprises a mounting boss at a laterally widened portion of said first trailing arm that forms a mounting flange that rests directly on a corresponding mounting flange formed on the axle beam for direct attachment to the axle beam.

21. The vehicle suspension according to claim 20 wherein said mounting boss includes at least one laterally protruding flange that extends outwardly from each of said first and said second trailing arms to mount an additional suspension component.

22. The vehicle suspension according to claim 17 wherein said air spring support portions for each of said first and said second trailing arms comprises a first support portion that supports a first air spring and a second support portion that supports a second air spring, said first and second support portions extending along a common longitudinal axis with said first air spring being positioned at a wheel center of an associated one of the first and second wheels and said second air spring being longitudinally spaced from said first air spring in a rearward direction such that said second air spring is positioned at a rear edge of the associated one of the first and second wheels.

23. The vehicle suspension according to claim 22 wherein each of said first and said second trailing arms includes a variable thickness extending along a length of said first and said second trailing arms.

24. The vehicle suspension according to claim 16 wherein said first trailing arm and said second trailing arm each comprise a resilient member made from a spring material.

25. The vehicle suspension according to claim 16 wherein each of said first and said second trailing arms comprises a single-piece resilient member with said first end comprising one of a fore and aft endmost position and with said second end comprising the other of said fore and aft endmost position, and wherein said air spring support portion is provided at one of said fore and aft endmost positions, said pivotal mount is at the other of said fore and aft endmost positions, and said axle mount portion is longitudinally positioned between said fore and aft endmost positions such that at least one air spring is longitudinally offset from the axle beam.

* * * * *

UNITED STATES PATENT AND TRADEMARK OFFICE
CERTIFICATE OF CORRECTION

PATENT NO. : 7,618,049 B2
APPLICATION NO. : 11/522042
DATED : November 17, 2009
INVENTOR(S) : Varela et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 351 days.

Signed and Sealed this

Fourteenth Day of December, 2010

David J. Kappos
*Director of the United States Patent and Trademark Office*